(12) United States Patent  (10) Patent No.: US 7,284,450 B2
Orleskie et al.  (45) Date of Patent: Oct. 23, 2007

(54) AVERAGING ORIFICE PRIMARY FLOW ELEMENT

(75) Inventors: Charles Theodore Orleskie, Berthoud, CO (US); Terry Xen Beachey, Longmont, CO (US)

(73) Assignee: Dieterich Standard, Inc., Boulder, CO (US)

( * ) Notice: Subject to any disclaimer, the term of this patent is extended or adjusted under 35 U.S.C. 154(b) by 709 days.

(21) Appl. No.: 10/119,283

(22) Filed: Apr. 9, 2002

(65) Prior Publication Data

US 2003/0188586 A1    Oct. 9, 2003

(51) Int. Cl.
    *G01F 1/37*    (2006.01)
(52) U.S. Cl. .................................. 73/861.52
(58) Field of Classification Search ............. 73/861.61, 73/861.42, 861.52, 861.65
    See application file for complete search history.

(56) References Cited

U.S. PATENT DOCUMENTS

| | | | |
|---|---|---|---|
| 2,687,645 A | 8/1954 | Velten et al. | |
| 3,071,001 A | 1/1963 | Goldsmith | |
| 3,487,688 A | 1/1970 | Magliozzi | |
| 3,521,487 A | 7/1970 | Akeley | |
| 3,545,492 A | 12/1970 | Scheid, Jr. | |
| 3,590,637 A * | 7/1971 | Brown | 73/172 |
| 3,645,298 A | 2/1972 | Roberts et al. | |
| 3,733,898 A | 5/1973 | Yamamoto et al. | |
| 3,750,710 A | 8/1973 | Hayner | |
| 3,779,076 A | 12/1973 | Akeley | |
| 3,805,612 A | 4/1974 | Shiba | |
| 3,838,598 A | 10/1974 | Tompkins | |
| 4,040,293 A | 8/1977 | Wilson | |
| 4,538,470 A | 9/1985 | Snell | |
| 4,557,296 A | 12/1985 | Byrne | |
| 4,884,460 A * | 12/1989 | Nowacki et al. | 73/861.52 |
| 4,961,344 A | 10/1990 | Rodder | |
| 5,086,655 A | 2/1992 | Fredericks et al. | |
| 5,279,155 A | 1/1994 | Johnson et al. | |
| 5,295,397 A | 3/1994 | Hall et al. | |

(Continued)

FOREIGN PATENT DOCUMENTS

GB    0522708    6/1992

(Continued)

OTHER PUBLICATIONS

Supplementary European Search Report issued in EP 03709290.5 on Mar. 29, 2007.

*Primary Examiner*—Harshad Patel
(74) *Attorney, Agent, or Firm*—Marshall, Gerstein & Borun LLP

(57) ABSTRACT

A process flow device that includes a self-averaging orifice plate type of primary flow element for measuring, by a differential pressure process, the volumetric rate of fluid flow at a point in a fluid carrying conduit where the velocity profile of the fluid is asymmetric with respect to the longitudinal axis of the conduit. The improved flow element comprises a planar flow-impeding plate disposed transversely across the interior of the conduit and perpendicular to the longitudinal axis thereof. The plate includes at least three circular apertures eccentrically disposed with respect to the longitudinal axis of the conduit to create static pressure averaging on the downstream side of the plate. Upstream and downstream static pressure sensing ports are respectively provided on opposite sides of the flow impeding plate.

50 Claims, 5 Drawing Sheets

U.S. PATENT DOCUMENTS

| | | |
|---|---|---|
| 5,297,426 A | 3/1994 | Kane et al. |
| 5,327,941 A | 7/1994 | Bitsakis et al. |
| 5,341,848 A | 8/1994 | Laws |
| 5,461,932 A | 10/1995 | Hall et al. |
| 5,529,093 A | 6/1996 | Gallagher et al. |
| 5,596,152 A | 1/1997 | Bergervoet et al. |
| 5,817,950 A * | 10/1998 | Wiklund et al. ......... 73/861.66 |
| 6,053,055 A | 4/2000 | Nelson |
| 6,164,142 A | 12/2000 | Dimeff |
| 6,186,179 B1 | 2/2001 | Hill |
| 6,311,568 B1 * | 11/2001 | Kleven .................... 73/861.42 |
| 6,321,166 B1 | 11/2001 | Evans et al. |
| 6,345,536 B1 | 2/2002 | Morrison et al. |
| 6,494,105 B1 | 12/2002 | Gallagher |
| 6,543,297 B1 * | 4/2003 | Kleven .................... 73/861.52 |
| 6,622,573 B2 * | 9/2003 | Kleven .................... 73/861.42 |

FOREIGN PATENT DOCUMENTS

| | | |
|---|---|---|
| JP | 58191922 | 11/1983 |
| JP | 63253258 | 4/1987 |
| WO | WO-95/02165 | 7/1994 |
| WO | 99/40393 | 8/1999 |

\* cited by examiner

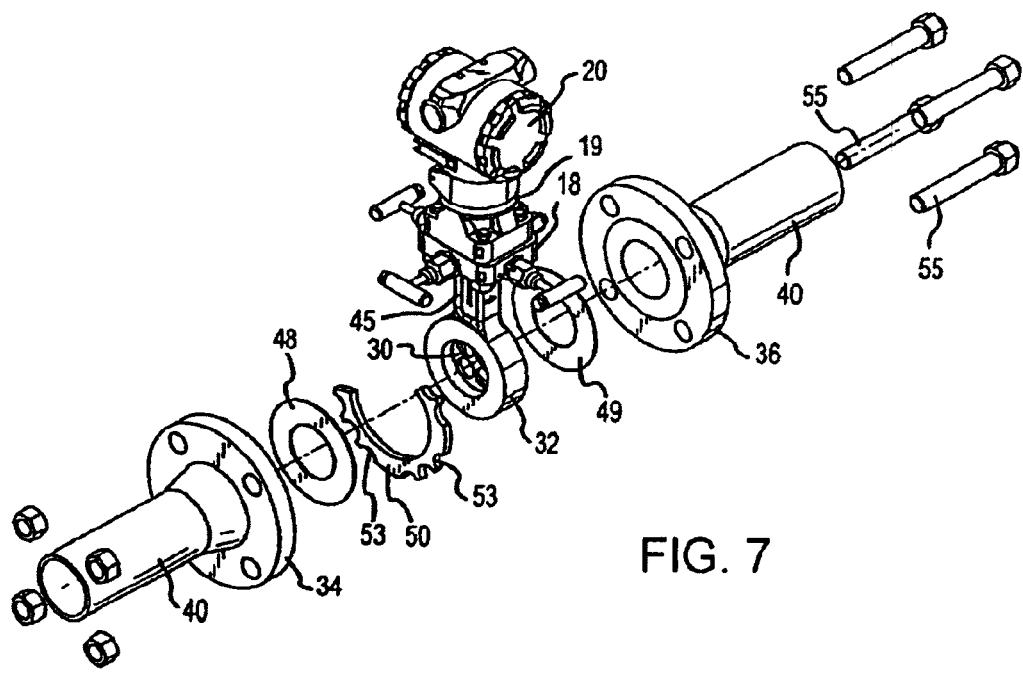
FIG. 7
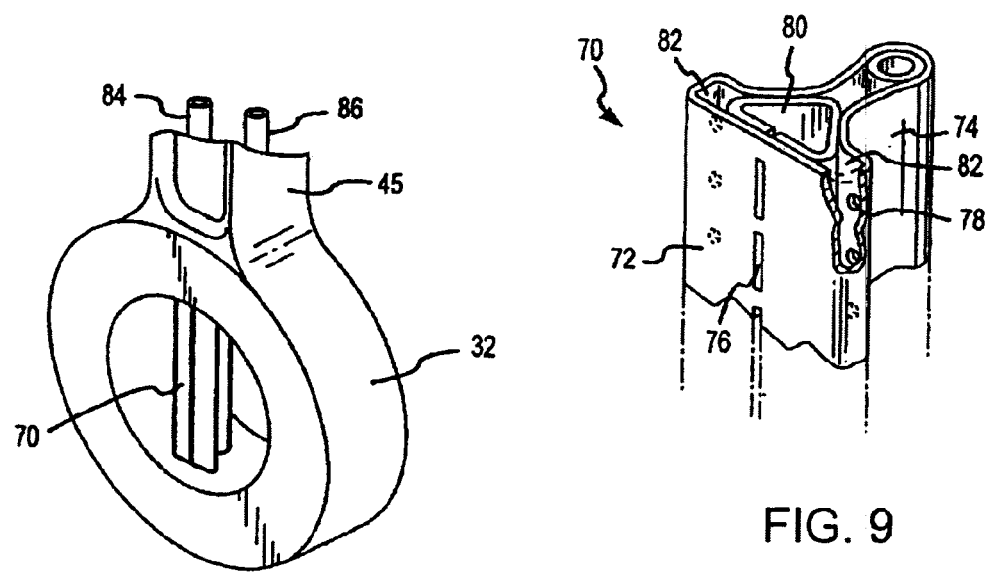
FIG. 8
FIG. 9

AVERAGING ORIFICE PRIMARY FLOW ELEMENT

FIELD OF THE INVENTION

The present invention relates generally to a process flow device that includes a self-averaging orifice plate type of primary flow element for measuring, by a differential pressure process, the volumetric rate of fluid flow at a point in a fluid carrying conduit where the velocity profile of the fluid is asymmetric with respect to the longitudinal axis of the conduit.

BACKGROUND OF THE INVENTION

Orifice plate flow meters having a single centered opening in a plate constriction that is disposed diametrically within a fluid-carrying pipe, with differential pressure measurement means on the upstream and downstream sides of the constriction, have been in existence for a long period of time. While the accuracy of such devices is good for long runs of pipe, orifice plate flow meters suffer the disadvantage of poor performance when placed in short pipe runs that follow a flow disturbance created by upstream apparatus, such as an elbow, expander, reducer, valve or other discontinuity. For measurement accuracy with an orifice plate flow meter, a long straight run of pipe (in excess of ten diameters in some instances) upstream of the flow meter is required in order to present a fully developed symmetrical velocity profile to the orifice plate, with the highest fluid velocity occurring coaxially with the center of the orifice plate constriction. When an upstream pipe fitting or other device skews the velocity profile, the pressures measured at the orifice flow meter pressure taps is in error.

To reduce the asymmetry of the velocity profile created by an upstream fitting, the commonly used apparatus is a flow straightener, of the type disclosed in U.S. Pat. No. 5,596,152 or apparatus similar to the flow conditioner described in U.S. Pat. No. 3,733,898. A more complex apparatus, employing a plurality of elongated openings arranged in a predetermined pattern in a transversely disposed plate within the fluid-conducting pipe, together with a computer to deal with the necessary algorithms, is disclosed in U.S. Pat. No. 5,295,397. Yet another device for reducing the adverse measuring effects of a distorted velocity profile is known as the piezometer ring. This appliance may surround the orifice on both sides of the orifice plate and, by means of a plurality of circumferentially disposed pressure sensing ports, averages pressures around the upstream and downstream sides of the orifice. Although not shown with an orifice plate flow meter, a piezometer type of averaging sensor is described generally in U.S. Pat. No. 5,279,155.

Flow straighteners, conditioners, computers and piezometers are moderately effective to properly condition the velocity profile for introduction to an orifice plate flowmeter, or average the asymmetric velocity of the flow, but have the disadvantage of adding separate and additional components to the process piping with the attendant initial cost, pressure drop in the fluid, and increased maintenance requirements.

Accordingly, the primary object of the present invention is to provide a primary flow element that achieves the accuracy benefits of the orifice plate type of flow meter, but is not restricted to long runs of upstream piping prior to the flow meter's positioning in the pipe.

A corresponding objective of the invention is to provide a primary flow element where the means for interrupting the fluid flow is a differential pressure orifice plate that achieves an averaging of the differential pressures across the plate, despite velocity profile distortion of the fluid presented to the primary flow element, and without the added piezometer and its computer, flow straightening or flow conditioning apparatus.

Other and further objects, features and advantages of the invention will become apparent from the following description of embodiments of the invention, taken in conjunction with the accompanying drawings.

SUMMARY OF THE INVENTION

The successful operation of traditional orifice plate flow meters is based on Bernoulli's theorem which states that along any one streamline in a moving fluid, the total energy per unit mass is constant, being made up of the potential energy, the pressure energy and the kinetic energy of the fluid. Thus, when fluid passes through the orifice in a constricting pipe plate, the velocity of the fluid through the orifice increases. This increase in fluid velocity causes the dynamic pressure of the fluid immediately downstream of the orifice plate to increase, while simultaneously decreasing the static pressure of the fluid at that same point. By sensing the static pressure on the upstream and downstream sides of the orifice plate, the decrease of static pressure on the downstream side results in a measurement of the pressure differential, dP, between the upstream side of the orifice plate and the downstream side. The rate of fluid flow q is proportional to $\sqrt{dP}$. As earlier stated, prior art orifice plate flow meters work well when the velocity profile is symmetrical about the longitudinal axis of the pipe in which the fluid is flowing. In such a case, the highest velocity fluid is along the central axis of the pipe, coaxial with the orifice of the constricting pipe plate. When traveling through the orifice, the highest velocity fluid is the fluid that produces the pressure differential across the plate to provide the flow rate result.

However, if the velocity profile is skewed a lower velocity fluid will pass through the orifice and the downstream static pressure will be a reflection of that lower velocity fluid. The differential pressure thus produced across the constricting plate will not be a true indication of the rate of fluid flow.

According to the present invention, a constrictive plate, or flow impedance device, having a plurality of variously positioned orifices is placed in a fluid-carrying conduit with static pressure measurement taken on the upstream and downstream sides of the plate. Each of the plurality of orifices will conduct a part of the total fluid flow within the conduit. According to Bernoulli's theorem, the velocity of the fluid through each of the orifices will increase, and the static fluid pressure on the downstream side of the constricting plate that is attributable to each of the separate orifices will be averaged within the fluid to provide an average downstream static pressure. The average downstream static pressure is compared with the upstream static pressure to provide an average differential pressure for whatever velocity profile is presented to the multiple orifice plate, resulting in an accurate measurement of the rate of fluid flow in the pipe.

Integrally incorporating the multiple orifice plate into the central opening of an annular ring with intermediate upstream and downstream static pressure measuring ports disposed within the ring, provides added simplicity to the primary flow element. This simplicity is further enhanced when the annular ring is provided with a projecting stem that is capable of conducting the sensed differential pressure to other flow processing accessories mounted on the stem.

DESCRIPTION OF THE DRAWINGS

FIG. 7 is an exploded view of the assembly of FIG. 6.

FIG. 8 is a prospective view of a modified form of the annular mounting ring of FIG. 5 wherein the annular ring supports a pitot tube type of primary flow element instead of the averaging orifice plate, as shown in FIG. 5.

FIG. 9 is an enlarged fragmentary prospective view of the exemplary pitot tube illustrated in FIG. 8 as being mounted within the annular ring.

DETAILED DESCRIPTION

Figure 1:
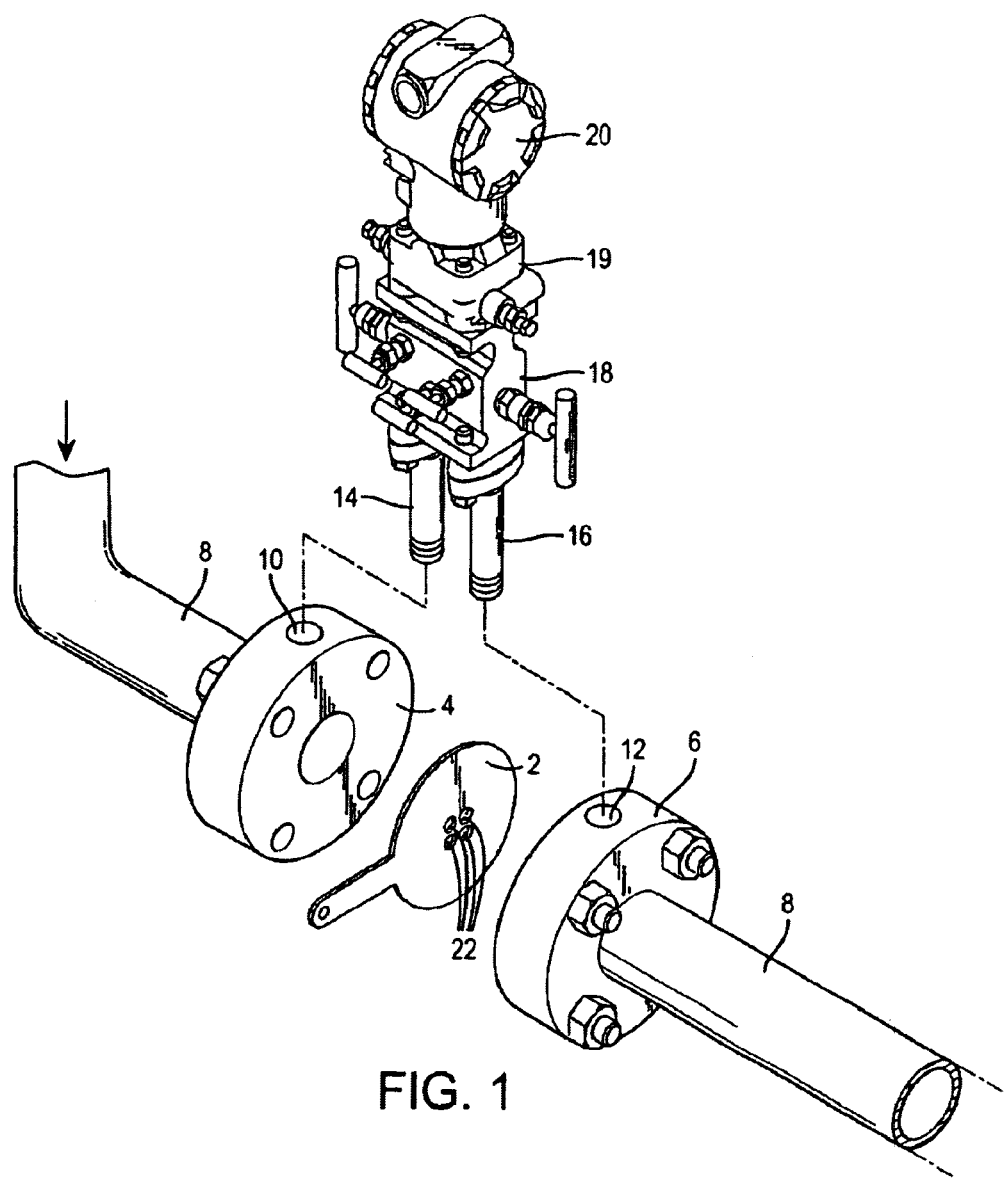
FIG. 1 is a perspective exploded view of an averaging orifice primary flow element of the present invention positioned between two opposing mounting flanges fixed to the ends of a fluid carrying conduit. Dashed lines indicate the connection of accessory flow processing devices with the upstream and downstream pressure ports disposed within the mounting flanges.
Figure 1A:
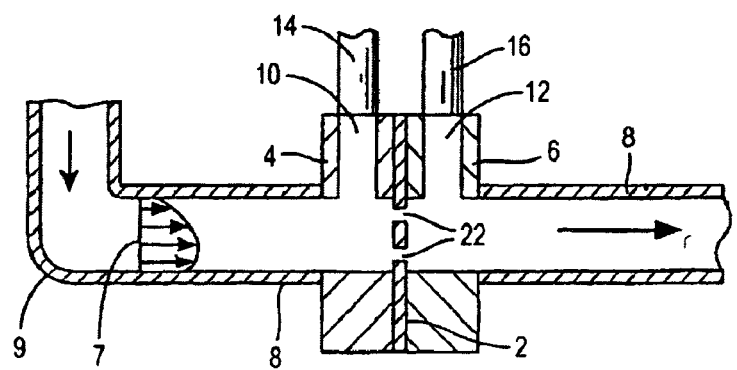
FIG. 1A is a fragmentary cross sectional view of the piping and primary flow element of FIG. 1, illustrating a representative velocity profile of the fluid in the pipe that would exist shortly downstream of an elbow in the piping.

A simplified version of the present invention is shown in FIGS. 1 and 1A. An averaging orifice primary flow element 2 is positioned between two opposing mounting flanges 4 and 6 fixed to the ends of a fluid-carrying conduit 8 just below an elbow 9 where the velocity profile 7 is skewed. Each of the mounting flanges contain a radially extending pressure sensing port 10 and 12 that communicate with the fluid flowing in the pipe and are respectively connected through conduits 14 and 16 to a valve manifold 18 and into a pressure transducer 19. An electrical signal that represents the sensed differential pressure between the ports 10 and 12 is transmitted by transmitter 20 to a processing unit (not shown).

Figure 2C:
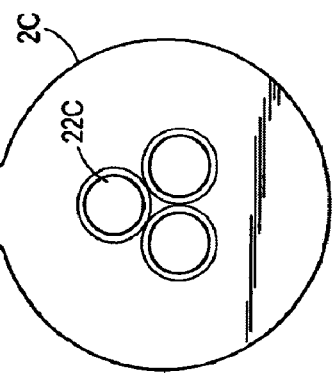
FIGS. 2, 2A, 2B, and 2C are plan views of four different configurations of the averaging orifice primary flow element of the present invention The views are taken from a position downstream of the orifice plate, looking upstream.
Figure 2B:
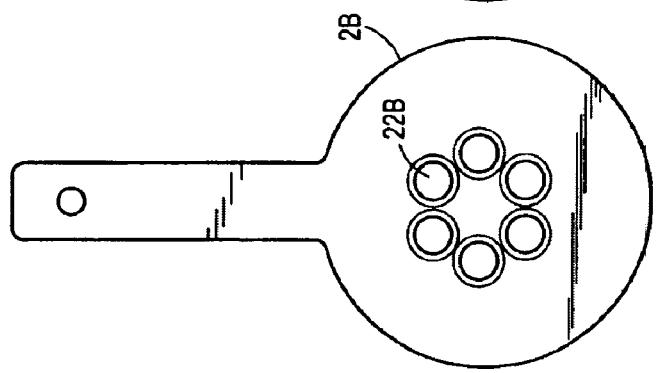
Figure 3:
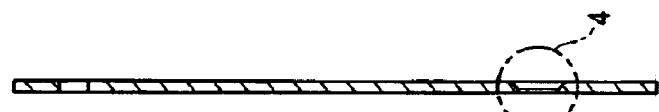
FIG. 3 is a cross sectional view taken along lines 3—3 of FIG. 2A.
Figure 2A:
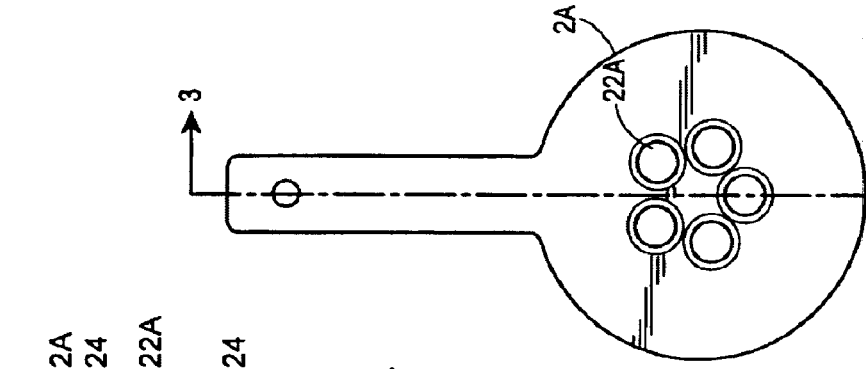
Figure 4:
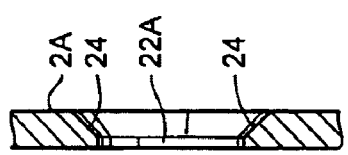
FIG. 4 is an enlarged fragmentary detail of a portion of FIG. 3.
Figure 2:
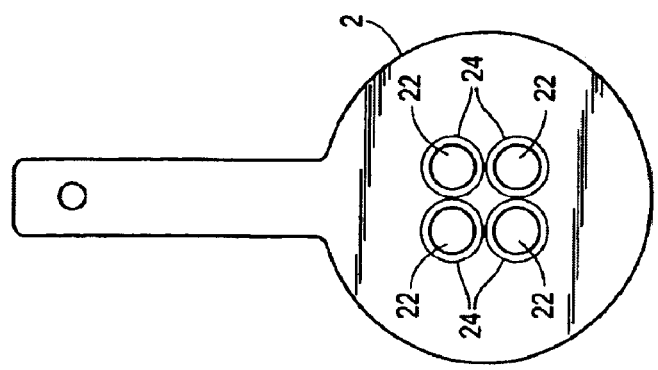

The primary flow element 2, also shown in FIG. 2, comprises a circular plate having four apertures 22 symmetrically arranged around the center of the plate 2. The center of the flow element plate 2 is positioned coaxially with the longitudinal centerline of the pipe 8. The plate 2 is retained in place by the sandwiching pressure of flanges 4 and 6. As shown in FIGS. 3 and 4, the circumferential edges 24 of the apertures 22 on the downstream side of the flow element plate 2 are preferably, but not necessarily, chamfered in order to facilitate expansion of the fluid column that flows through each aperture.

FIGS. 2A and 2B illustrate additional embodiments of the primary flow element in which there are an increased plurality of apertures 22A and 22B clustered around the center of primary flow element plates 2A and 2B. While the invention will be described with respect to the four aperture embodiment of FIG. 2, it is understood that four apertures in the primary flow element plate is only one of many possible configurations of apertures. One particular configuration and number of apertures may be more appropriate to a given fluid, fluid profile and piping characteristics than another. However, the principal of operation is the same, regardless of the number or location of apertures in the constricting plate. The number or configuration of apertures is not limited by the illustrations of FIGS. 2 through 2B.

FIG. 2C illustrates an additional embodiment of the primary flow element in which there is a reduced plurality of apertures 22C clustered around the center of primary flow element plate 2C.

It is seen from FIG. 1A that the velocity of the fluid approaching the upper pair of apertures 22 in the constricting plate 2 is less than the velocity of the fluid approaching the lower pair of apertures 22. These initial differences in fluid velocity will not only influence the static pressure sensed by the pressure port 10 on the upstream side of the plate 2, they will also impact the velocity of the fluid that passes through the respective pairs of apertures and accordingly, will affect the static fluid pressure sensed by the downstream port 12. Because the velocity of fluid through each of the apertures, or each pair of apertures, will be different, the static pressure on the downstream side of the plate 2 that is a function of the fluid velocity through each of the apertures will be averaged within the fluid and the downstream pressure port 12 will sense that averaged static pressure. With a plurality of apertures positioned around the center of the plate 2, such as, for example, the four apertures 22 shown in FIGS. 2 and 5, the static pressure will be averaged, even when the fluid profile is nonsymmetrical about two pipe axes, as it would be when the fluid is swirling.

Figure 5:
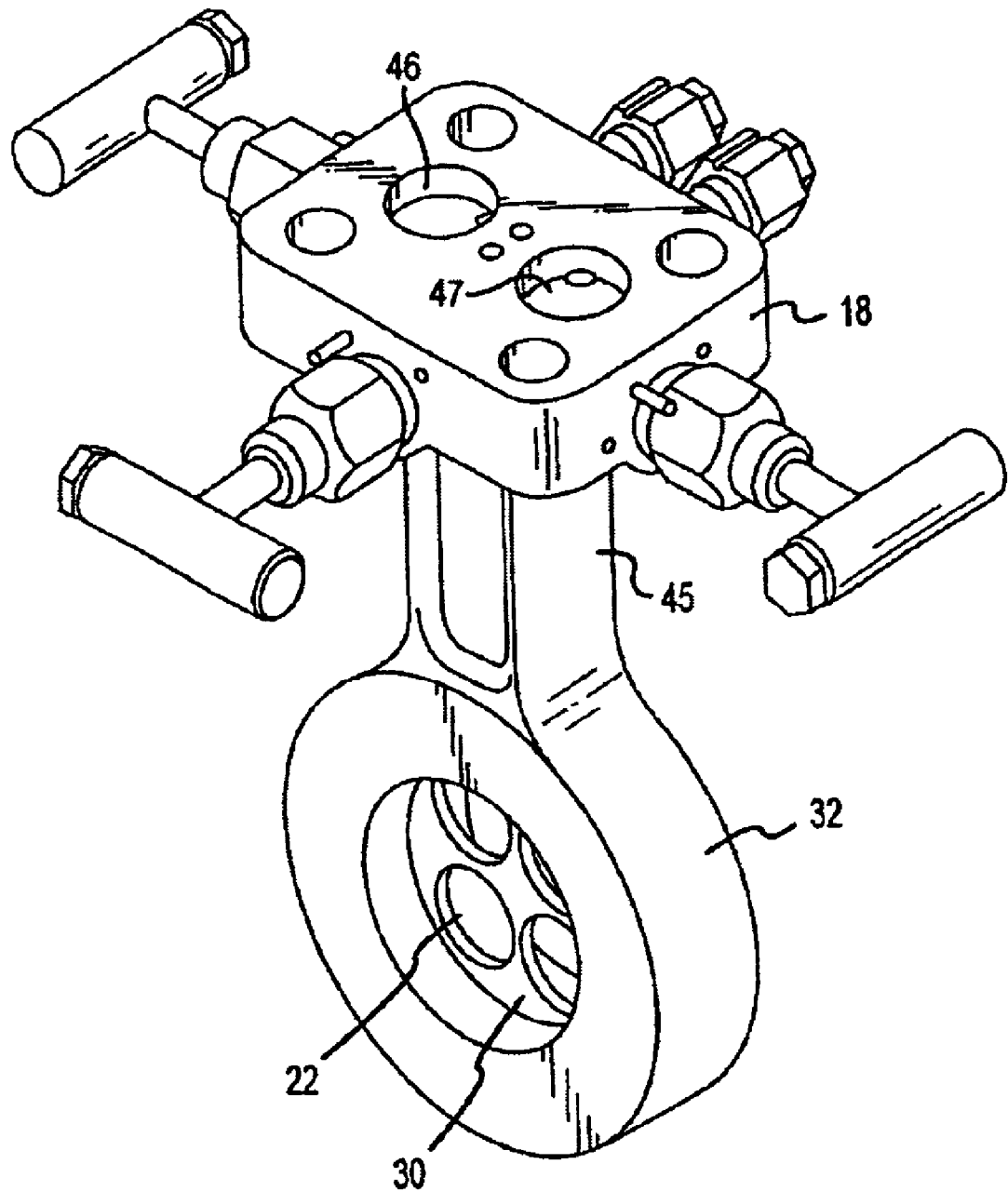
FIG. 5 is a perspective view of the embodiment of the present invention wherein the averaging orifice primary flow element is integrally incorporated intermediate the ends of an annular mounting ring with a projecting pressure communicating stem that mounts a valve-carrying manifold.
Figure 6:
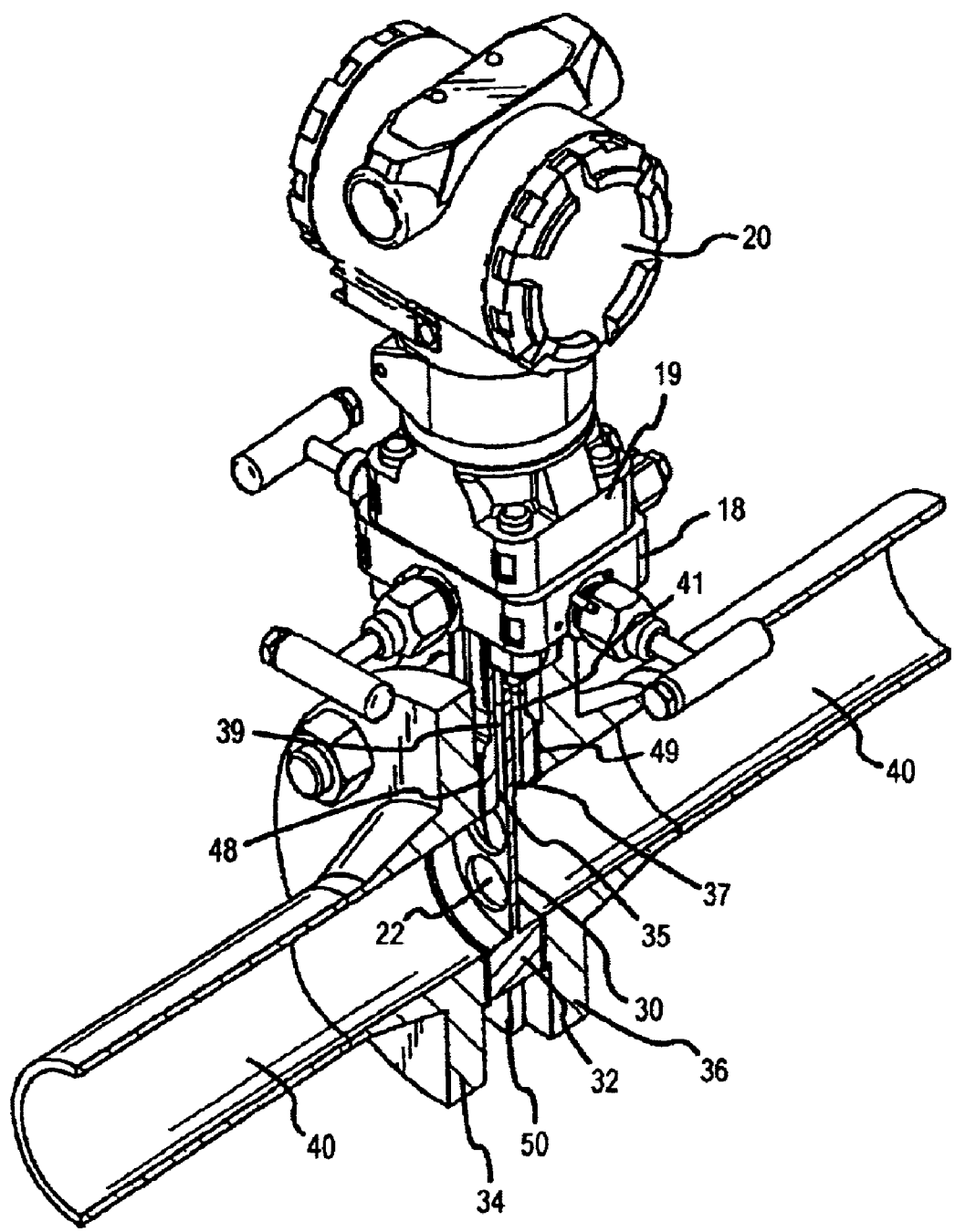
FIG. 6 is a fragmentary perspective view of the FIG. 5 embodiment of the present invention, as supported between opposing mounting flanges on the ends of a fluid carrying conduit.

A modified form of a four-aperture primary flow element plate 30 is shown in FIG. 5, integrally formed with the annular ring, or wafer, 32 that is insertable between the flanges 34 and 36 attached to the ends of two sections of a fluid-carrying pipe 40. Upstream and downstream pressure sensing ports 35 and 37 are located on each side of the flow element plate 30, as seen in FIG. 6. The pressure sensing ports 35 and 37 connect through conduits 39 and 41 in the stem 45 to conduits 46 and 47 in the manifold 18. The FIG. 5 embodiment is also illustrated in FIGS. 6 and 7, illustrating the total flow meter assembly inserted between pipe sections that carry the fluid whose flow rate is to be measured.

The wafer 32 is an annular ring whose inside diameter corresponds to the inside diameter of the fluid-carrying pipe 40. The flow element plate 30 is positioned across the ring opening substantially equidistant from each of the lateral sides of the wafer ring 32. The wafer is mounted between two gaskets 48 and 49 that interface with the pipe end flanges 34 and 36. A semi-circular positioning ring 50 functions to position and secure the wafer 32 in its proper place between the pipe flanges. Positioning of the wafer 32 is achieved by placing it into the cradle formed by the interior of the ring 50 and seating the shanks of the fastening bolts 55 into the outer grooves of the ring.

With the averaging orifice plate 30 being integrally constructed with the mounting ring wafer 32 and the conduit carrying stem 45 and with the transmitter mounting manifold 18 being directly attached to the stem 45, several important advantages are achieved. Most importantly, the differential pressure generating mechanism, the pressure sensing ports, the manifold and the transmitter components are incorporated into a single unit that is easily insertable between the flanges of pipe sections. In addition, the differential pressure generating mechanism may comprise types of primary flow elements other than orifice plates. For example, as shown in FIG. 8, an averaging pitot tube 70, such as that disclosed in U.S. Pat. No. 6,321,166 B1, may be diametrically disposed across the opening of the ring wafer 32.

A fragmentary section of an exemplary pitot tube 70 is shown in FIG. 9. Such a pitot tube has upstream and downstream facing surfaces 72 and 74 each with respective high pressure and low static pressure sensing ports 76 and 78 that communicate with interiorly disposed high and low pressure conducting conduits 80 and 82 connected to the piping conduits 84 and 86 housed in the annulus stem 45.

What is claimed is:

1. An averaging orifice plate fluid flow meter for measuring the volumetric rate of fluid in a conduit, comprising:
   a constant diameter conduit for carrying fluid from an upstream to a downstream location;
   a planar flow impedance plate disposed transversely across the interior of the conduit;
   a set of at least three circular apertures in the planar flow impedance plate eccentrically disposed with respect to the longitudinal axis of the conduit, wherein the set of at least three circular apertures defines all of the circular apertures disposed through the planar flow impedance plate that are eccentrically disposed with respect to a center point of the planar flow impedance plate, wherein each of the set of at least three circular apertures has a center point that is disposed on a single circle having a center point coincident with the center point of the planar flow impedance plate so that the set of at least three circular apertures are disposed symmetrically around the center point of the planar flow impedance plate;
   a first static pressure sensing element disposed within the conduit upstream of the planar flow impedance plate and proximate thereto;
   a second static pressure sensing element disposed within the conduit downstream of the planar flow impedance plate and proximate thereto; and
   a transmitter coupled to the first and second static pressure sensing elements to determine the volumetric rate of fluid in the conduit.

2. The averaging orifice plate fluid flow meter for measuring the volumetric rate of fluid in a conduit of claim 1, wherein each of the first and second pressure sensing elements comprises a bore disposed through the constant diameter conduit.

3. The averaging orifice plate fluid flow meter for measuring the volumetric rate of fluid in a conduit of claim 1, wherein constant diameter conduit includes first and second sections separated by the planar flow impedance plate.

4. The averaging orifice plate fluid flow meter for measuring the volumetric rate of fluid in a conduit of claim 3, wherein each of the first and second sections includes a mounting flange disposed thereon.

5. An averaging differential pressure primary flow measuring element for insertion between sections of a fluid carrying conduit, comprising:
   first and second annular flanges having interior openings having a circular cross section of the same diameter and that correspond in shape and size to the inside cross section of the conduit;
   a flow impedance plate having a center point, the flow impedance plate being disposed between the first and second annular flanges transverse to a longitudinal axis of the interior openings of the annular flanges so that the center point of the flow impedance plate is coaxial with the longitudinal axis of the interior openings of the annular flanges; and
   a set of circular holes disposed through the flow impedance plate, the set of circular holes defining a plurality of circular holes and defining all of the circular holes disposed through the flow impedance plate that are eccentrically disposed with respect to the center point of the flow impedance plate, wherein each of the set of circular holes has a center point that is disposed on a single circle having a center point coincident with the center point of the flow impedance plate so that the plurality of circular holes within the set of circular holes are disposed symmetrically around the center point of the flow impedance plate.

6. The averaging differential pressure primary flow measuring element of claim 5, wherein each of the plurality of circular holes within the set of circular holes has the same diameter.

7. The averaging differential pressure primary flow measuring element of claim 6, wherein each of the plurality of circular holes within the set of circular holes includes a first edge point disposed proximate to a point at which a wall defining the interior opening of one of the annular flanges meets the flow impedance plate.

8. The averaging differential pressure primary flow measuring element of claim 7, wherein each of the plurality of circular holes within the set of circular holes includes a second edge point disposed proximate to a second edge point of another one of the plurality of circular holes within the set of circular holes.

9. The averaging differential pressure primary flow measuring element of claim 8, wherein the distance between the first edge point and the point at which the wall defining the interior opening of one of the annular flanges meets the flow impedance plate is approximately the same as the distance between the second edge points of adjacent ones of the plurality of circular holes within the set of circular holes.

10. The averaging differential pressure primary flow measuring element of claim 5, wherein each of the plurality of circular holes within the set of circular holes includes an edge point disposed proximate to an edge point of another one of the plurality of circular holes within the set of circular holes.

11. The averaging differential pressure primary flow measuring element of claim 5, wherein the area defined by the plurality of circular holes within the set of circular holes is less than the area defined by the flow impedance plate bounded by the interior openings of the annular flanges and not defined by any of the plurality of circular holes within the set of circular holes.

12. The averaging differential pressure primary flow measuring element of claim 5, wherein the center point of each of the plurality of circular holes within the set of circular holes is disposed closer to an interface at which a wall defining the interior opening of one of the annular flanges meets the flow impedance plate than to the center point of the flow impedance plate.

13. The averaging differential pressure primary flow measuring element of claim 5, wherein the plurality of circular holes includes three circular holes.

14. The averaging differential pressure primary flow measuring element of claim 13, wherein the three circular holes are disposed on the circle so that a set of lines connecting the center points of adjacent ones of the three circular holes forms an equal-sided triangle around the center point of the flow impedance plate.

15. The averaging differential pressure primary flow measuring element of claim 5, wherein the plurality of circular holes includes four circular holes.

16. The averaging differential pressure primary flow measuring element of claim 15, wherein the four circular holes are disposed on the circle so that a set of lines connecting the center points of adjacent ones of the four circular holes forms a square around the center point of the flow impedance plate.

17. The averaging differential pressure primary flow measuring element of claim 5, wherein the plurality of circular holes includes five circular holes.

18. The averaging differential pressure primary flow measuring element of claim 17, wherein the five circular holes are disposed on the circle so that a set of lines connecting the center points of adjacent ones of the five circular holes forms a pentagon around the center point of the flow impedance plate.

19. The averaging differential pressure primary flow measuring element of claim 5, wherein the plurality of circular holes includes six circular holes.

20. The averaging differential pressure primary flow measuring element of claim 19, wherein the six circular holes are disposed on the circle so that a set of lines connecting the center points of adjacent ones of the six circular holes forms a hexagon around the center point of the flow impedance plate.

21. The averaging differential pressure primary flow measuring element of claim 5, wherein the first and second annular flanges are mounting flanges.

22. The averaging differential pressure primary flow measuring element of claim 5, wherein the first and second annular flanges are mounting flanges and further including first and second pressure conducting bores radially disposed in the first and second annular mounting flanges for establishing fluid communication between the respective interior openings in the first and second annular mounting flanges and circumferential outside surfaces of the first and second annular mounting flanges.

23. The averaging differential pressure primary flow measuring element of claim 5, wherein each of the circular holes within the plurality of circular holes has opposite circumferential edges, and wherein one of the circumferential edges of each of the circular holes within the plurality of circular holes is beveled.

24. The averaging differential pressure primary flow measuring element of claim 5, wherein the set of circular holes defines all of the circular holes disposed through the flow impedance plate.

25. An averaging differential pressure primary flow measuring element for insertion between sections of a fluid carrying conduit, comprising:
  an integrally formed annular ring having flat parallel sides with an interior opening having a circular cross section of the same diameter as and that corresponds in shape and size to the inside cross section of the conduit;
  a flow impedance plate disposed transversely across the interior opening in the annular ring and parallel to the sides of the annular ring, the flow impedance plate having a center point that is coaxial with a longitudinal axis of the interior opening of the annular ring; and
  a set of circular holes disposed through the flow impedance plate, the set of circular holes defining a plurality of circular holes and defining all of the circular holes disposed through the flow impedance plate that are eccentrically disposed with respect to the center point of the flow impedance plate, wherein each of the set of circular holes has a center point that is disposed on a single circle having a center point coincident with the center point of the flow impedance plate so that the plurality of circular holes within the set of circular holes are disposed symmetrically around the center point of the flow impedance plate.

26. The averaging differential pressure primary flow measuring element of claim 25, further including first and second pressure conducting bores radially disposed in the annular ring on opposite sides of the flow impedance plate.

27. The averaging differential pressure primary flow measuring element of claim 26, further including an elongated mounting stem radially extending from a circumferential outside surface of the annular ring and having first and second conduits disposed longitudinally therethrough that communicate with the respective first and second pressure conducting bores.

28. An averaging differential pressure flow element for determining the volumetric rate of fluid flow in a circular conduit of constant diameter on either side of the flow element, comprising:
  a fluid flow section with a circular central opening that corresponds in shape and size to the inside cross section of the circular conduit;
  a flat disk, congruent with the circular central opening, and having a center point, said flat disk being disposed within the circular central opening within a plane that is perpendicular to the longitudinal axis of the circular central opening; and
  a set of circular holes disposed through the flat disk, the set of circular holes defining a plurality of circular holes and defining all of the circular holes disposed through the flat disk that are eccentrically disposed with respect to the center point of the flat disk, wherein each of the set of circular holes has a center point that is disposed on a single circle having a center point coincident with the center point of the flat disk so that the plurality of circular holes within the set of circular holes are disposed symmetrically around the center point of the flat disk.

29. The averaging differential pressure flow element of claim 28, further including a differential pressure sensor fluidly coupled to either side of the flat disk and a transmitter coupled to the differential pressure sensor.

30. The averaging differential pressure flow element of claim 28, further including,
  a supporting arm extending radially from the fluid flow section, said arm including first and second interiorly disposed fluid transportation conduits that extend into the fluid flow section, and
  first and second pressure sensing ports communicating with the interior opening of the fluid flow section on respective opposite sides of the flat disk.

31. The averaging differential pressure flow element of claim 28, wherein each of the plurality of circular holes within the set of circular holes includes a first edge point disposed proximate to a point at which a wall defining the circular central opening of the fluid flow section meets the flat disk.

32. The averaging differential pressure flow element of claim 31, wherein each of the plurality of circular holes within the set of circular holes includes a second edge point disposed proximate to a second edge point of another one of the plurality of circular holes within the set of circular holes.

33. The averaging differential pressure flow element of claim 32, wherein the distance between the first edge point and the point at which the wall defining the circular central opening of the fluid flow section meets the flat disk is approximately the same as the distance between the second edge points of adjacent ones of the plurality of circular holes within the set of circular holes.

34. The averaging differential pressure flow element of claim 28, wherein each of the plurality of circular holes within the set of circular holes includes an edge point disposed proximate to an edge point of another one of the plurality of circular holes within the set of circular holes.

35. The averaging differential pressure flow element of claim 28, wherein the area defined by the plurality of circular holes within the set of circular holes is less than the area defined by the flat disk bounded by the circular central opening of the fluid flow section and not defined by any of the plurality of circular holes within the set of circular holes.

36. The averaging differential pressure flow element of claim 28, wherein the center point of each of the plurality of circular holes within the set of circular holes is disposed closer to an interface at which a wall defining the central circular opening of the fluid flow section meets the flat disk than to the center point of the flat disk.

37. The averaging differential pressure flow element of claim 28, wherein the plurality of circular holes includes three circular holes.

38. The averaging differential pressure flow meter of claim 37, wherein the three circular holes are disposed on the circle so that a set of lines connecting the center points of adjacent ones of the three circular holes forms an equal-sided triangle around the center point of the flat disk.

39. The averaging differential pressure flow element of claim 28, wherein the plurality of circular holes includes four circular holes.

40. The averaging differential pressure flow element of claim 39, wherein the four circular holes are disposed on the circle so that a set of lines connecting the center points of adjacent ones of the four circular holes forms a square around the center point of the flat disk.

41. The averaging differential pressure flow element of claim 28, wherein the plurality of circular holes includes five circular holes.

42. The averaging differential pressure flow element of claim 41, wherein the five circular holes are disposed on the circle so that a set of lines connecting the center points of adjacent ones of the five circular holes forms a pentagon around the center point of the flat disk.

43. The averaging differential pressure flow element of claim 28, wherein the plurality of circular holes includes six circular holes.

44. The averaging differential pressure flow element of claim 43, wherein the six circular holes are disposed on the circle so that a set of lines connecting the center points of adjacent ones of the six circular holes forms a hexagon around the center point of the flat disk.

45. The averaging differential pressure flow element of claim 28, further including first and second pressure conducting bores radially disposed in the fluid flow section on opposite sides of the flat disk.

46. The averaging differential pressure flow element of claim 45, further including an elongated mounting stem radially extending from a circumferential outside surface of the fluid flow section and having first and second conduits disposed longitudinally therethrough that communicate with the respective first and second pressure conducting bores.

47. The averaging differential pressure flow element of claim 28, wherein each of the circular holes within the plurality of circular holes has opposite circumferential edges, and wherein one of the circumferential edges of each of the circular holes within the plurality of circular holes is beveled.

48. The averaging differential pressure flow element of claim 28, wherein the set of circular holes defines all of the circular holes disposed through the flat disk.

49. The averaging differential pressure flow element of claim 28, wherein the fluid flow section includes an annulus defining the circular central opening.

50. The averaging differential pressure flow element of claim 28, wherein the fluid flow section includes first and second flanges on either side of the circular central opening.

* * * * *